United States Patent
Dai

(12) 
(10) Patent No.: US 6,792,551 B2
(45) Date of Patent: Sep. 14, 2004

(54) METHOD AND APPARATUS FOR ENABLING A SELF SUSPEND MODE FOR A PROCESSOR

(75) Inventor: Xia Dai, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 520 days.

(21) Appl. No.: 09/995,171

(22) Filed: Nov. 26, 2001

(65) Prior Publication Data

US 2003/0101362 A1 May 29, 2003

(51) Int. Cl.$^7$ .................................................. G06F 1/32
(52) U.S. Cl. ........................................ 713/320; 713/324
(58) Field of Search ................................. 713/300, 320, 713/323, 324; 711/117, 118, 119; 712/1, 37

(56) References Cited

U.S. PATENT DOCUMENTS

| | | | | |
|---|---|---|---|---|
| 5,784,628 A | * | 7/1998 | Reneris | 713/300 |
| 5,905,994 A | * | 5/1999 | Hori et al. | 711/113 |
| 6,085,330 A | * | 7/2000 | Hewitt et al. | 713/322 |
| 6,189,107 B1 | * | 2/2001 | Kim et al. | 713/300 |

* cited by examiner

Primary Examiner—Lynne H. Browne
Assistant Examiner—Paul Yanchus, III
(74) Attorney, Agent, or Firm—Blakely, Sokoloff, Taylor & Zafman LLP

(57) ABSTRACT

In accordance with an embodiment of the present invention, a triggering event is initiated to place a processor in a low power state. The voltage from a first voltage regulator supplied to a core of the processor may be lowered to a level at which the processor core becomes non-operational and the processor state is lost. The processor may include a memory region in which the processor state may be stored upon entering the low power state. This memory region may be powered by a second voltage regulator so that its contents are not lost while in the low power state. For one embodiment of the present invention, the processor may additionally include a snoop controller powered by the second voltage regulator. This snoop controller may snoop a cache, which may also be powered by the second voltage regulator, while the processor is in the low power state. The snoop controller may additionally monitor interrupts.

25 Claims, 3 Drawing Sheets

METHOD AND APPARATUS FOR ENABLING A SELF SUSPEND MODE FOR A PROCESSOR

The present invention relates to computer systems and more particularly to reducing the amount of power consumed by an electronic device, such as a processor, in a low power state.

BACKGROUND

Computer systems are becoming increasingly pervasive in our society, including everything from small handheld electronic devices, such as personal data assistants and cellular phones, to application-specific electronic components, such as set-top boxes and other consumer electronics, to medium-sized mobile and desktop systems to large workstations and servers. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well. Historically, the power consumed by a computer system has been limited by two factors. First, as power consumption increases, the computer tends to run hotter, leading to thermal dissipation problems. Second, the power consumed by a computer system may tax the limits of the power supply used to keep the system operational, reducing battery life in mobile systems and diminishing reliability while increasing cost in larger systems.

The present invention addresses this and other problems associated with the prior art.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a triggering event is initiated to place a processor in a low power state. To reduce leakage in this low power state, the voltage from a first voltage regulator supplied to the core of the processor may be lowered to a level at which the processor core becomes non-operational and the processor state is lost. The processor may include a memory region in which the processor state may be stored upon entering the low power state. This memory region may be powered by a second voltage regulator so that its contents are not lost while in the low power state. For one embodiment of the present invention, the processor may additionally include a snoop controller powered by the second voltage regulator. This snoop controller may snoop the L2 cache, which may also be powered by the second voltage regulator, while the processor is in the low power state. The snoop controller may additionally monitor interrupts.

A more detailed description of embodiments of the present invention, including various configurations and implementations, is provided below.

As used herein, the term "while" is intended to mean during all or some portion of time within the period of time that satisfies a condition. For example, the statement "event 'A' occurs while event 'B' occurs" is intended to mean that event A may occur during all or some portion of the period of time during which event B occurs.

Also, as used herein, the term "upon" is intended to mean before, after, or during the occurrence of an associated event. For example, the statement "event 'A' occurs upon the occurrence of event 'B'" is intended to mean that event 'A' may occur before, after, or during the occurrence of event 'B', but is nevertheless associated with the occurrence of event 'B'. As a more specific example, "saving a state of the processor upon entering the low power state" means that the state of the processor may be saved before, after, or during the transition to the low power state, and saving the state is associated with the low power state transition.

Figure 1:
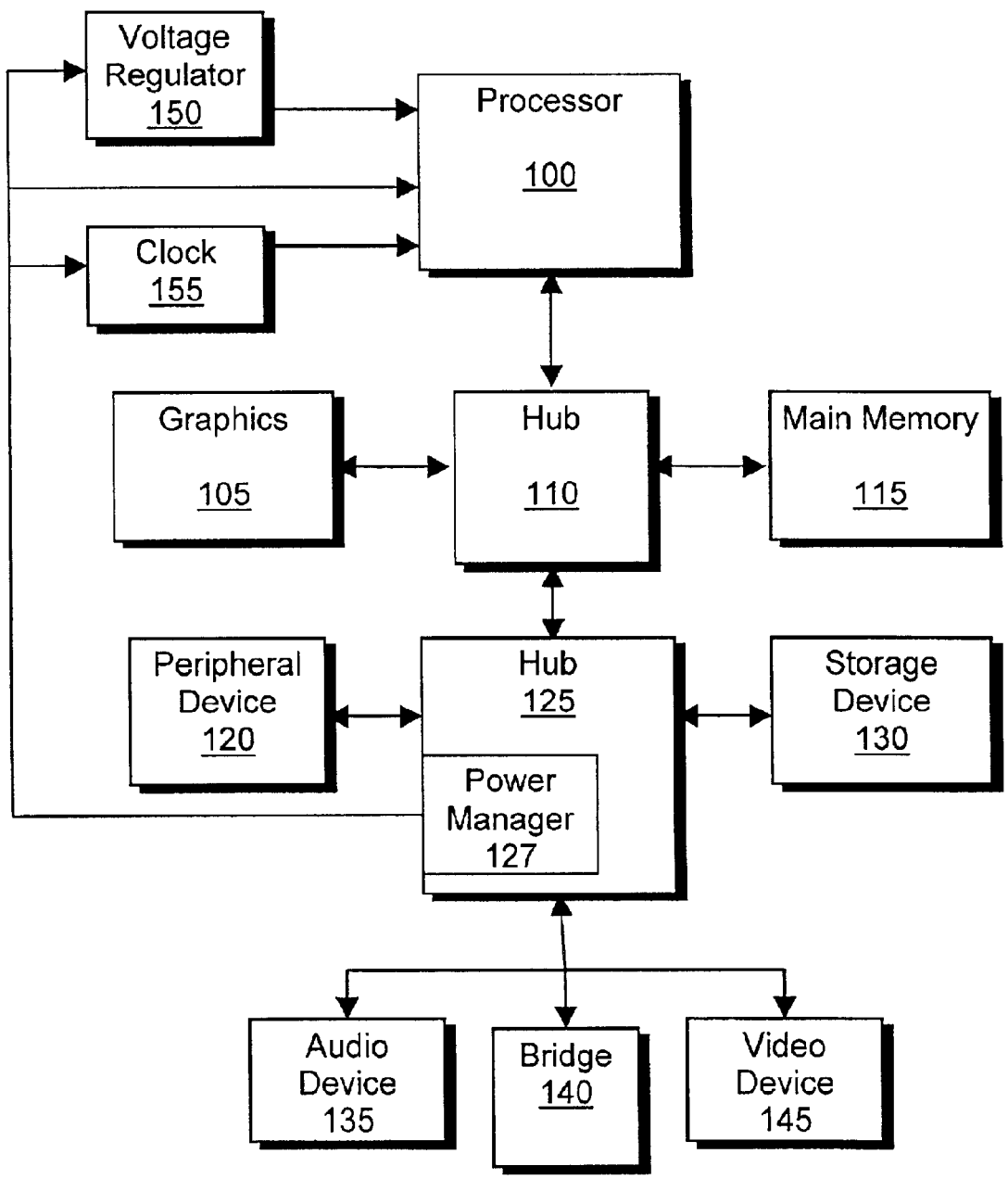
FIG. 1 includes a computer system formed in accordance with an embodiment of the present invention.

FIG. 1 includes a computer system that may be formed in accordance with an embodiment of the present invention. As shown, the computer system may include a processor 100 coupled to hub 110. Processor 100 may be powered by one or more voltages from voltage regulator 150, and clock 155 may provide a clock signal to processor 100. Processor 100 may communicate with graphics controller 105, main memory 115, and hub 125 via hub 110. Hub 125 may couple peripheral device 120, storage device 130, audio device 135, video device 145, and bridge 140 to hub 110.

Audio device 135 may include, for example, a speaker, a microphone, or other input/output device. Video device 145 may include, for example, a display screen, camera, or other video input/output device. Bridge 140 may couple hub 125 to one or more additional buses coupled to one or more additional peripheral devices. Peripheral device 120 may be one or more other peripheral devices. Note that in accordance with alternate embodiments of the present invention, a computer system may include more or fewer devices than those shown in FIG. 1, and the devices of FIG. 1 may be partitioned differently.

Note that a method of an embodiment of the present invention may be implemented by the computer system of FIG. 1 programmed to execute various steps of the method. This program may reside, at least in part, in any machine-readable medium such as a magnetic disk (e.g. a hard drive or floppy disk), an optical disk (e.g. a CD or DVD), a semiconductor device (e.g. Flash, EPROM, or RAM), or a carrier wave (e.g. an electrical or wireless data signal), all of which are collectively represented by storage device 130 of FIG. 1.

Hub 125 of FIG. 1 includes a power manager 127. Power manager 127 may send power status signals to voltage regulator 150, processor 100 and clock 155. These power status signals may be in accordance with the Advanced Configuration and Power Interface Specification, Rev. 2.0, published Jul. 27, 2000. These power status signals may indicate the power states of one or more components of the computer system. In accordance with an alternate embodiment of the present invention, power manager 127 may reside within a different component of the computer system (such as within hub 110 or processor 100), may be a discrete component, or may be distributed among multiple components of the computer system.

Figure 2:
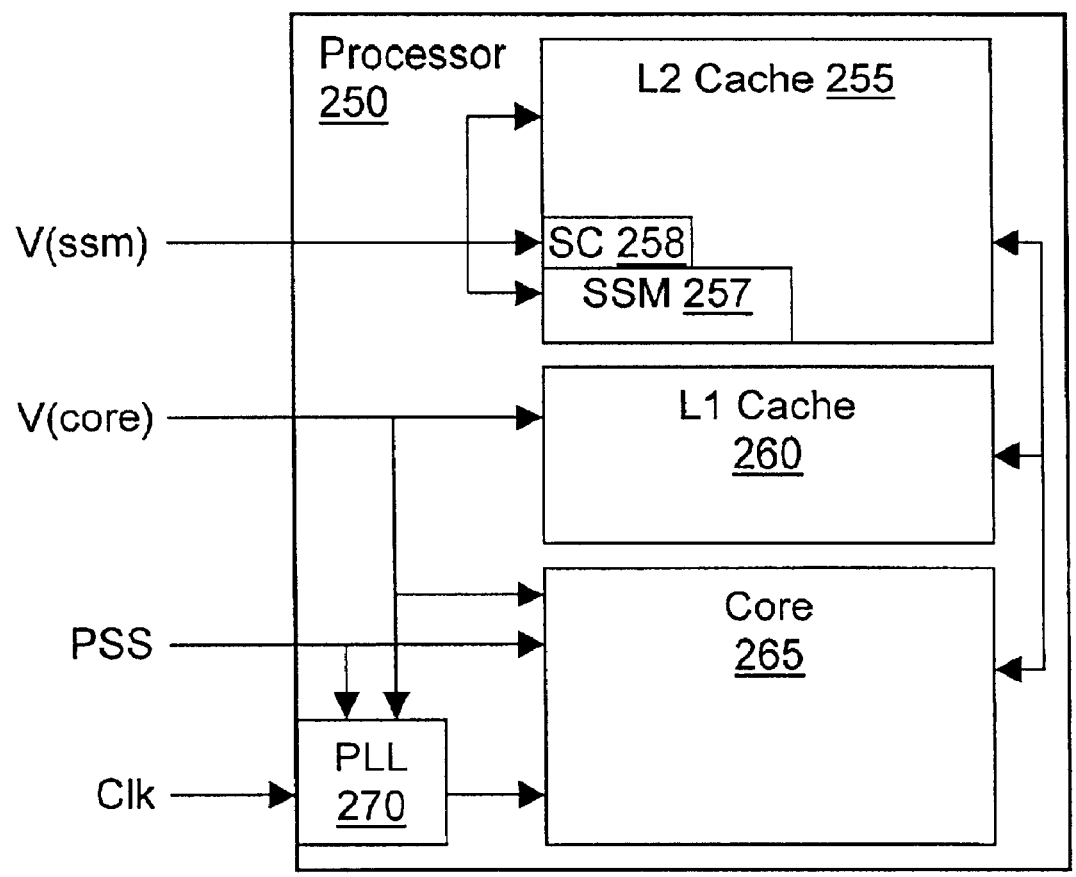
FIG. 2 includes a processor formed in accordance with an alternate embodiment of the present invention.

FIG. 2 includes a processor formed in accordance with an embodiment of the present invention. In accordance with one embodiment of the present invention, processor 250 may be implemented as processor 100 of FIG. 1, or, alternatively, processor 250 may be another device such as a graphics controller (also to be encompassed under the generic term "processor" as used herein). As shown, processor 250 may include two or more voltage supply input ports to receive two or more voltages from one or more voltage regulators (such as voltage regulator 150 of FIG. 1). Voltage V(ssm) may be provided to L2 cache 255, snoop controller (SC) 258, and self-suspend memory (SSM) 257 to power these components. Voltage V(core) may be provided to L1 cache 260, core 265, and phase locked loop (PLL) 270 to power these components. Core 265 of FIG. 2 may include a pipeline of processor 250, including execution units and registers for executing instructions. In accordance with one embodiment of the present invention, core 265 includes the majority of the registers and other storage elements that define the processor state.

In accordance with one embodiment of the present invention, processor 250 of FIG. 2 includes SSM 257. SSM 257 is a memory region formed on the same semiconductor substrate as processor 250. SSM 257 may be large enough to store the state of processor 250 that would otherwise be lost when the voltage to core 265 is reduced while in a low power state (to be described in more detail below). In accordance with one embodiment of the present invention, SSM 257 is approximately 1 KB in size. In accordance with one embodiment of the present invention, SSM 257 may constitute a portion of L2 cache 255 and may be formed using the same memory technology as L2 cache 255, such as SRAM. For an alternate embodiment, the SSM may be independent of the L2 cache and may be formed using SRAM or any other memory technology, including, for example, DRAM, EEPROM, flash, etc. In accordance with one embodiment of the present invention, SSM 257 may be protected using error checking and correction (ECC) code to reduce the effects of soft errors.

In accordance with one embodiment of the present invention, processor 250 of FIG. 2 includes snoop controller 258. Snoop controller 258 may service snoop requests to the processor, snooping L2 cache 255 while the processor is in a low power state and core 265 (which would normally service a snoop request) is non-operational. Thus, cache coherency may be maintained while the processor is in the low power state. For one embodiment of the present invention, snoop controller 258 may additionally monitor interrupts to the processor, waking the processor from the low power state when interrupt requests are to be serviced by the processor. For an alternate embodiment of the present invention, processor 250 may not include a snoop controller, and, consequently, cache snooping may not be supported by the processor while in the low power state. For this embodiment, an access of main memory by a bus master may generate a snoop request to the processor, causing processor to exit the low power state and enter a wake state to service the snoop request. For an alternate embodiment of the present invention, the snoop controller snoops alternate caches or other memory regions of the processor, other than, or in addition to, the L2 cache.

In accordance with one embodiment of the present invention, the voltage V(ssm) powers not only SSM 257 but also snoop controller 258 and L2 cache 255 of FIG. 2. For this embodiment, the contents of the L2 cache may not be flushed (i.e. the contents are maintained) upon entering the low power state because the contents of the cache may be held by the voltage V(ssm) while in the low power state. For an alternate embodiment of the present invention, other components of processor 250 may be powered by voltage V(ssm), such as, for example, L1 cache 260 or a portion of core 265. As will be described below, components powered by voltage V(ssm) may maintain their contents while processor 250 is in a low power state whereas components powered by voltage V(core) may lose their contents while in the low power state.

For an alternate embodiment of the present invention, L2 cache 255 of FIG. 2 may be powered by V(core) rather than V(ssm). For this embodiment, the L2 cache may be flushed upon entering the low power state because the contents of the cache may be lost due to the reduced voltage level of V(core) while in the low power state. For this embodiment, snoop controller 258 may be eliminated because there may not be an operational cache to snoop while in the low power state. Note that for this embodiment, SSM 257 may still be powered by V(ssm) so that its contents (the processor state) may be maintained while in the low power state.

In accordance with one embodiment of the present invention, processor 250 of FIG. 2 may additionally include one or more power status signal (PSS) ports to receive a power status signal (which may include one or more individual signals) from an external source such as from power manager 127 of FIG. 1. The PSS port may be coupled to PLL 270 and core 265 to provide the power status signal to these components of processor 250. In accordance with an alternate embodiment of the present invention, the power status signal may be generated internally, e.g. within core 265 of processor 250, and provided to components of processor 250. The power status signal may be internally generated based on, for example, data provided to processor 250 and stored in one or more registers of processor 250.

In accordance with one embodiment of the present invention, processor 250 of FIG. 2 may include a clock (clk) input port to receive one or more clock signals from an external clock generator such as clock 155 of FIG. 1. The clock signal may be provided to core 265 via PLL 270 (which may serve to multiply its frequency). Note that the clock to the core may be on or off depending not only on whether or not PLL 270 provides the clock signal to core 265 but also on whether or not the external clock source, such as clock 155, provides the clock signal to PLL 270.

Figure 3:
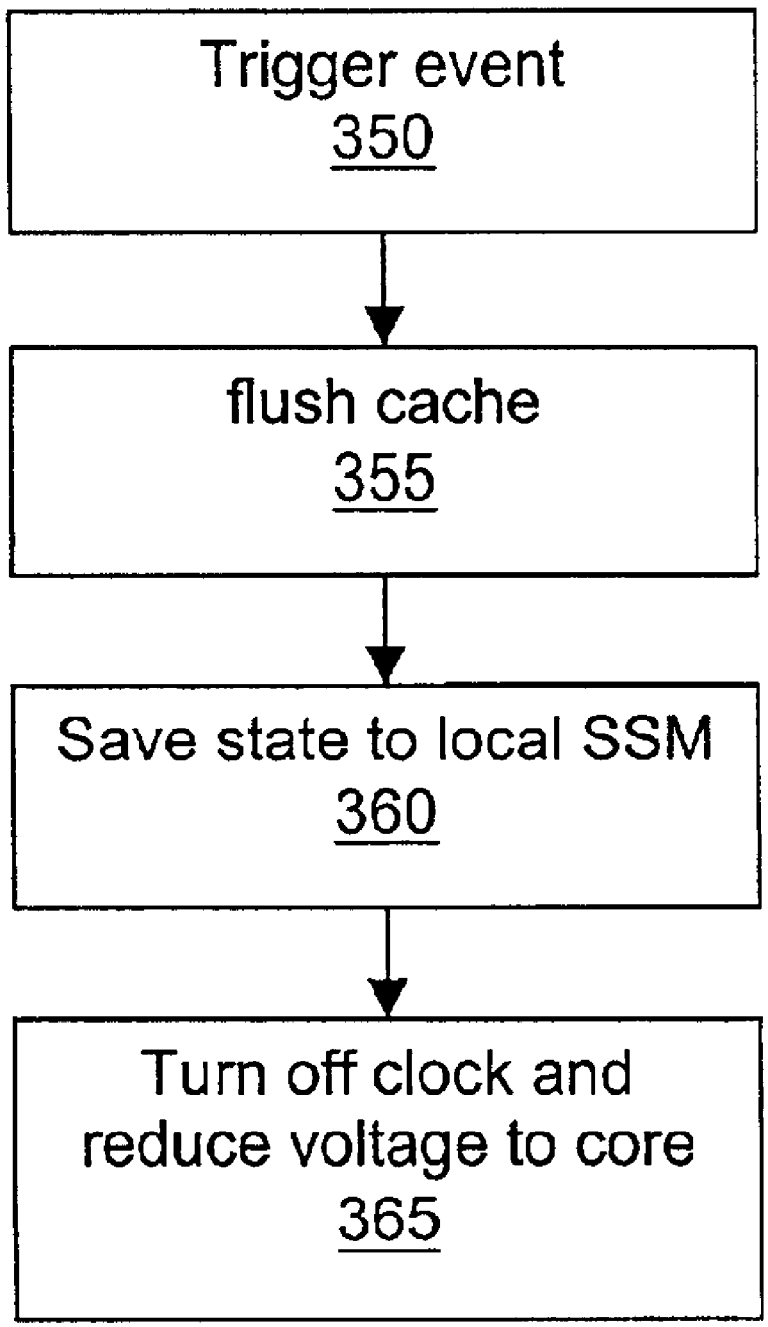
FIG. 3 includes a flow chart showing a method of the present invention.

FIG. 3 includes a flow chart showing a method of the present invention. In accordance with one embodiment of the present invention, the method of FIG. 3 may be implemented on the computer system of FIG. 1 including the processor of FIG. 2.

At step 350 of FIG. 3, an event occurs that triggers the processor to transition into a low power state. This triggering event may be a request by a user such as, for example, when a user presses a "sleep" or "suspend" button on a computer system. The triggering event may alternatively be the execution by the computer system of an instruction that requests a transition to a low power state. Alternatively, the triggering event may be initiated by the computer system upon detecting inactivity of the computer system for a timeout period.

In response to the triggering event that occurs at step 350 of FIG. 3, a particular power status signal (which may include one or more individual signals) may be sent from power manager 127 of FIG. 1. This power status signal may be used by various components of the computer system, such as one or more voltage regulators, the clock, and one or more processors, to place the system in the desired low power state.

In accordance with an embodiment of the present invention, at step 355 of FIG. 3, the cache of the processor is flushed. In accordance with one embodiment of the present invention, the cache that is flushed may include the L1 cache, the L2 cache, or both. For example, in accordance with an embodiment in which the L1 cache is powered by voltage V(core) and the L2 cache is powered by voltage V(ssm), the L1 cache may be flushed to the L2 cache. Note that for an embodiment of the present invention in which the L1 cache is divided into a data portion and an instruction portion, only the data portion of the L1 cache may be flushed. In accordance with this embodiment, the instruction portion of the L1 cache may simply be invalidated upon the processor waking from the low power state. In accordance with alternate embodiments of the present invention, alternate cache levels may be implemented in a processor, and one or more of these caches may be flushed at step 325. The cache flushed at step 325 may be any cache powered by a voltage that is to be reduced at step 365.

For one embodiment of the present invention, the processor state is saved to the SSM at step 360 of FIG. 3. The state of the processor may include the stored contents of the processor, core including many general and special registers, including, for example, floating point registers, memory type range registers, control registers, model specific registers, test registers, machine-check architecture registers, interrupt state registers, strapping options registers, performance counters, timer stamps, etc. In addition to these registers, the processor state saved to the SSM may include microcode patch data. Much of this data will be lost in the processor core upon reducing the voltage supplied to the core upon transitioning to the low power state.

At step 365 of FIG. 3, the voltage supplied to the processor core, V(core), as well as to the one or more of the caches flushed at step 355 may be reduced. In accordance with one embodiment of the present invention, the clock to the processor core is also stopped so that the clock is off while the processor is in the low power state. Reducing the voltage to the processor reduces the leakage current in the processor, thereby reducing the power consumption of the processor. In accordance with one embodiment of the present invention, the voltage supplied to the SSM of the processor, V(ssm), as well as to one or more of the caches not flushed at step 355, if any, is not reduced.

To further reduce the power consumption of the processor, for an alternate embodiment of the present invention, the voltage supplied to the SSM is also reduced at step 365 of FIG. 3. For this embodiment, the voltage that powers the SSM may not be reduced below a voltage level that unreasonably jeopardizes the integrity of the data stored in the SSM. For example, V(ssm) may be reduced to a voltage level that may be found to significantly reduce leakage current while maintaining an acceptable soft error rate. In accordance with one embodiment of the present invention, V(ssm) may be reduced by half. In accordance with an alternate embodiment of the present invention, V(ssm) may be reduced to between the average threshold voltage of a majority of transistors in the SSM and twice that average.

In accordance with one embodiment of the present invention, V(core) may be reduced at step 365 to a voltage level that is less than V(ssm). V(core) may be reduced to a voltage level that may be found to significantly reduce leakage current. In accordance with one embodiment of the present invention, V(core) may be reduced by half. For an alternate embodiment of the present invention, V(core) may be reduced to less than the average threshold voltage of a majority of transistors in the processor core. For an alternate embodiment of the present invention, V(core) may be reduced to approximately zero volts (or grounded). V(core) may be reduced to a voltage level that causes the state of the processor in the core to be lost, and causes the core to be non-operational.

For one embodiment of the present invention, after the clock is stopped and the voltage is reduced at step 365 of FIG. 3, the processor is in the low power state. The processor may then be triggered to exit the low power state and re-enter a wake state by, for example, a power status signal or a snoop control circuit that is kept alive (powered) during the low power state. Upon exiting the lower power state, the voltage level may be raised to the initial operating level, the clock to the core may be turned back on, and the cache lines of flushed caches may be invalidated. The processor state stored in SSM may be reloaded back into the processor core and instructions may be executed normally.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A processor comprising:
   a first voltage supply input port to receive a first voltage at a first voltage level;
   a second voltage supply input port to receive a second voltage;
   a core to be powered by the first voltage; and
   a memory region to be powered by the second voltage, the memory region to store at least a portion of a state of the processor while the first voltage supply is at a second voltage level wherein, the second voltage level is a voltage level that may cause a processor state to be lost.

2. The processor of claim 1, wherein the second voltage level is lower than the first voltage level.

3. The processor of claim 1, wherein the second voltage level is approximately 0 volts.

4. The processor of claim 1, further comprising an L2 cache to be powered by the first voltage.

5. The processor of claim 1, further comprising a first cache to be powered by the first voltage, and a second cache to be powered by the second voltage.

6. The processor of claim 5, further comprising a snoop controller to be powered by the second voltage, the snoop controller to snoop the second cache while the first voltage supply is at the second voltage level.

7. The processor of claim 5, wherein the second voltage level is a voltage level that causes a processor state to be lost.

8. The processor of claim 1, wherein the memory region is a portion of a cache of the processor.

9. A computer system comprising:
   a first voltage regulator to supply a first voltage at a first voltage level during a first period of time and at a second voltage level during a second period of time, wherein the second voltage level is a voltage level that may cause a processor-state to be lost;
   a second voltage regulator to supply a second voltage; and
   a processor including a core to be powered by the first voltage and a memory region to be powered by the second voltage, the memory region to store at least a portion of a state of the processor during the second period of time.

10. The computer system of claim 9, wherein the second voltage level is less than half the first voltage level.

11. The computer system of claim 9, further comprising a clock to provide a clock signal to the processor, the clock signal to be on during the first period of time and off during the second period of time.

12. The computer system of claim 9, wherein the second period of time is associated with a low power state.

13. The computer system of claim 12, further comprising a cache to be powered by the second voltage, the cache to maintain its contents during the lower power state.

14. The computer system of claim 13, further comprising a snoop controller to be powered by the second voltage, the snoop controller to snoop the cache during the second period of time.

15. The computer system of claim 12, further comprising an L1 cache to be powered by the first voltage, the L1 cache to be flushed upon entering the lower power state.

16. The computer system of claim 9, wherein the portion of the state of the processor includes a strapping options register.

17. The computer system of claim 9, wherein the memory region is protected by error checking and correction (ECC) code.

18. A method comprising:
    triggering a processor of a computer system to enter a low power state in which a first voltage supplied to a core of the processor is reduced to a level that causes a state of the processor to be lost; and
    saving at least a portion of the state of the processor to a memory region of the processor upon entering the low power state, the memory region to be powered by a second voltage during the low power state.

19. The method of claim 18, further comprising flushing an L1 cache of the processor upon entering the low power state, the L1 cache to be powered by the first voltage.

20. The method of claim 18, further comprising maintaining contents of a cache of the processor upon entering the low power state, the cache to be powered by the second voltage.

21. The method of claim 20, further comprising performing a snoop of the cache during the low power state.

22. The method of claim 18, further comprising turning off a clock signal provided to the core upon entering the low power state.

23. A machine-readable medium including machine-readable instructions that, if executed by a machine, cause the machine to perform the method of claim 18.

24. A machine-readable medium including machine-readable instructions that, if executed by a machine, cause the machine to perform the method of claim 19.

25. A machine-readable medium including machine-readable instructions that, if executed by a machine, cause the machine to perform the method of claim 21.

* * * * *

UNITED STATES PATENT AND TRADEMARK OFFICE
CERTIFICATE OF CORRECTION

PATENT NO. : 6,792,551 B2
DATED : September 14, 2004
INVENTOR(S) : Dai

It is certified that error appears in the above-identified patent and that said Letters Patent is hereby corrected as shown below:

Column 6,
Line 31, delete "wherein," and insert -- , wherein --.

Signed and Sealed this

Fifteenth Day of February, 2005

JON W. DUDAS
*Director of the United States Patent and Trademark Office*